United States Patent
Kim et al.

(10) Patent No.: US 12,158,726 B2
(45) Date of Patent: Dec. 3, 2024

(54) POP-UP FLOATING TYPE HOLOGRAM SYSTEM AND VEHICLE THEREOF

(71) Applicants: Hyundai Motor Company, Seoul (KR); Kia Corporation, Seoul (KR)

(72) Inventors: Tae-Hyung Kim, Incheon (KR); Chan-Joo Moon, Hwaseong-Si (KR); Geun-Hyung Nam, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 643 days.

(21) Appl. No.: 17/516,353

(22) Filed: Nov. 1, 2021

(65) Prior Publication Data
US 2022/0308525 A1    Sep. 29, 2022

(30) Foreign Application Priority Data
Mar. 25, 2021   (KR) .......................... 10-2021-0039081

(51) Int. Cl.
  *G03H 1/04*     (2006.01)
  *B60K 35/00*    (2024.01)
  *H01F 7/02*     (2006.01)

(52) U.S. Cl.
  CPC .............. *G03H 1/04* (2013.01); *B60K 35/00* (2013.01); *H01F 7/0236* (2013.01); *G03H 2227/03* (2013.01); *G03H 2227/05* (2013.01)

(58) Field of Classification Search
  CPC .. G03H 1/04; G03H 2227/03; G03H 2227/05; B60K 35/00; H01F 7/0236
  USPC .......................................................... 359/9
  See application file for complete search history.

(56) References Cited

U.S. PATENT DOCUMENTS

| | | | | |
|---|---|---|---|---|
| 4,969,700 | A * | 11/1990 | Haines | G03H 1/08 359/9 |
| 6,219,090 | B1 * | 4/2001 | Nalwa | G02B 27/1066 348/E7.086 |
| 6,356,397 | B1 | 3/2002 | Nalwa | |
| 2002/0089765 | A1 * | 7/2002 | Nalwa | H04N 5/74 348/E7.086 |
| 2010/0033783 | A1 * | 2/2010 | Klug | G03H 1/22 359/9 |

(Continued)

FOREIGN PATENT DOCUMENTS

CN    204517988 U  *  7/2015
KR    10-0999576 B1   12/2010

OTHER PUBLICATIONS

CN-204517988-U—Geng—CN—Jul. 2015—English translation.*

*Primary Examiner* — Sharrief I Broome
(74) *Attorney, Agent, or Firm* — Morgan, Lewis & Bockius LLP

(57) ABSTRACT

A pop-up floating type hologram system mounted on a vehicle a pop-up floating module in which a hologram video projected by a video player provided with a skin plate as a vehicle external skin is implemented by a 45° tilted cube of a transparent plate externally exposed through any one of a crush pad, an emblem, an air spoiler, and a mobile holder in a pyramid form or externally exposed through a roof in a reverse pyramid form by the movement by a repulsive force between an electromagnet forming an N pole and a permanent magnet facing the electromagnet as an N pole by a power source supply, hiding the pop-up floating type hologram system using the external skin upon non-operation.

20 Claims, 11 Drawing Sheets

(56) References Cited

U.S. PATENT DOCUMENTS

2011/0304895 A1* 12/2011 Schwerdtner ............ G03H 1/08
359/9

* cited by examiner

POP-UP FLOATING TYPE HOLOGRAM SYSTEM AND VEHICLE THEREOF

CROSS-REFERENCE TO RELATED APPLICATION

The present application claims priority to Korean Patent Application No. 10-2021-0039081, filed on Mar. 25, 2021, the entire contents of which is incorporated herein for all purposes by this reference.

BACKGROUND OF THE INVENTION

Field of the Invention

The present invention relates to a hologram system, and particularly, to a vehicle to which a hologram system with a pop-up floating structure in which a shape of a 45° tilted transparent plate may be changed in a pyramid or reverse pyramid form is applied such that a package space constraint for a vehicle external skin is eliminated.

Description of Related Art

Recently, a hologram function is implemented in a vehicle.

As an example, the hologram function is used in a hologram device, the hologram device applies a 45° tilted transparent plate, a movable mechanism for moving the transparent plate, and the like, and the transparent plate is moved by the movable mechanism, implementing a hologram video in a pop-up state of the transparent plate on the vehicle external skin.

Therefore, the hologram device may be externally exposed in conjunction with a driver's operation to show the hologram video.

However, the transparent plate showing the hologram of the hologram device has a 45° tilted three-dimensional fixed structure, having a structural constraint in that it is difficult to be applied to the vehicle.

The most fundamental reason is because the transparent plate has a constant size in the fixed structure of the 45° tilted three-dimensional shape such that the package constraint for the vehicle external skin may be inevitably large due to the fixed size if the transparent plate is produced in the pop-up form and applied to the vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a pop-up floating type hologram system and a vehicle thereof, which may form a 45° tilted transparent plate in a shape deformable structure and be integrally formed with a vehicle external skin, hiding the hologram system using the external skin when an operation is not performed, and use a sliding structure in the pop-up floating structure for changing a shape of the 45° tilted transparent plate, eliminating a package space constraint for the vehicle external skin by saving a package space.

A hologram system according to various exemplary embodiments of the present invention for achieving the object includes a display module configured for projecting a hologram video and a pop-up floating module which pushes a permanent magnet, as an N pole, facing an electromagnet whose S pole is converted into an N pole by a current flow by a repulsive force with the electromagnet to raise a transparent plate of 0° to a 45° tilted cube, and forms the hologram video therein in a state where the 45° tilted cube protrudes to be externally exposed to show the hologram video outside through the transparent plate.

As various exemplary embodiments of the present invention, the electromagnet changes a current flow direction to convert the repulsive force into an attractive force.

As the exemplary embodiment of the present invention, the transparent plate includes a pair of a first transparent plate, a second transparent plate, a third transparent plate, and a fourth transparent plate formed in a triangular shape and formed as the 45° tilted cube.

As the exemplary embodiment of the present invention, the 45° tilted cube is formed in a pyramid form such that the display module projects the hologram video from a top to a bottom or formed in a reverse pyramid form so that the display module projects the hologram video from a bottom to a top of the tilted cube.

As the exemplary embodiment of the present invention, the display module is operated by receiving a power source of a battery from the outside thereof or operated by receiving a power source generated by an effect of a solar panel of the transparent plate.

As the exemplary embodiment of the present invention, the display module projects the hologram video by a video player, is provided with a skin plate matched with a vehicle external skin or a roof skin plate matched with a vehicle roof skin, and a projector or a mobile pad is applied to the video player.

As the exemplary embodiment of the present invention, the pop-up floating module includes a base frame including a frame body forming a bottom surface of the 45° tilted cube, and forming a rim channel forming a sliding movement path of the permanent magnet inside the frame body, a pyramid pop-up device provided with a transparent plate holder on an upper portion of the transparent plate, in which the permanent magnet slidably moved is coupled to a lower portion thereof, and forming an apical portion of the 45° tilted cube by constraining the upper portion of the transparent plate by the transparent plate holder, and an actuator device having the electromagnet facing the permanent magnet provided outside a rim portion of the base frame.

As the exemplary embodiment of the present invention, the rim channel is formed in an open structure so that the repulsive force operates in the state where the permanent magnet and the electromagnet face.

As the exemplary embodiment of the present invention, the frame body is provided with a communication block and a display charger, in which the communication block operates the electromagnet by a pop-up operation signal and a pop-up release signal for a current flow direction thereof, and operates the display module by a video signal for projecting the hologram video, and the display charger supplies a power source of a battery to the electromagnet and the display module.

As the exemplary embodiment of the present invention, a constraint structure of the transparent plate holder and the upper portion of the transparent plate is formed in an upper protrusion of the transparent plate fitted into a protrusion groove of the transparent plate holder, and the upper protrusion operates around rotation of raising the transparent plate by sliding movement through the protrusion groove.

As the exemplary embodiment of the present invention, the electromagnet receives a power source of a battery through an electromagnet power source line, and the electromagnet power source line is provided on the frame body of the base frame and connected to an electromagnet connector connected to the battery.

As the exemplary embodiment of the present invention, the actuator device forms the 45° tilted cube by a hydraulic motor configured for delivering a hydraulic pressure or a suction force to the transparent plate by a hydraulic hose or an electric motor configured for delivering a linear movement force to the transparent plate by a gear.

As the exemplary embodiment of the present invention, the display module and the pop-up floating module are connected to a controller configured for outputting a pop-up operation signal, a pop-up release signal, and a video signal, the pop-up operation signal and the pop-up release signal are outputted to the pop-up floating module to change a current flow direction so that an N pole and an S pole are formed in the electromagnet, and the video signal is outputted to the display module to project the hologram video.

As the exemplary embodiment of the present invention, the pop-up floating module is provided with a battery, and the battery supplies a power source to the display module and the electromagnet.

Furthermore, in a vehicle according to various exemplary embodiments of the present invention for achieving the object, a pop-up floating type hologram system is mounted on one of a crush pad forming a vehicle driver seat, an emblem representing a logo of a vehicle manufacturer, an air spoiler for improving air resistance performance during traveling, and a mobile holder for attaching a mobile device; and the hologram system is characterized that a hologram video projected by a video player provided with a skin plate as a vehicle external skin is implemented on the 45° tilted cube of the transparent plate externally exposed in a pyramid form by the movement by a repulsive force of a permanent magnet, as an N pole, facing an electromagnet forming an N pole by a power source supply.

Furthermore, in a vehicle according to various exemplary embodiments of the present invention for achieving the object, a pop-up floating type hologram system is mounted on a roof seating surface of a roof; the hologram system is characterized in that a hologram video projected by a video player provided with a roof skin plate as a vehicle external skin is implemented on the 45° tilted cube of the transparent plate externally exposed in a reverse pyramid form on the roof by the movement by a repulsive force of a permanent magnet, as an N pole, facing an electromagnet forming an N pole by a power source supply.

The pop-up floating type hologram system according to various exemplary embodiments of the present invention may have the following operations and effects in terms of the vehicle for implementing the hologram video.

First, it is possible to form the 45° tilted transparent plate in the pop-up floating structure in which the shape may be deformed, eliminating the package space constraint which makes it difficult to mount the hologram system on the vehicle. Second, it is possible to eliminate the package space constraint because the pop-up floating structure of the hologram system does not largely invade the internal space compared to the vehicle external skin, easily converging the hologram system and the vehicle external skin, which is prevented from being externally exposed when the operation is not performed, in the integral structure, and to pop-up and provide the hologram video in the specific situations, such as the driver operation linkage, the light detecting linkage, and the vehicle speed linkage. Third, it is possible to hide the hologram system by integrally forming the hologram system having the pop-up floating structure with the vehicle external skin, easily installing the hologram system on the vehicle external skin component, the vehicle interior mobile device holder, the hoop panel on the vehicle roof, or the like.

Furthermore, the pop-up floating type hologram system according to various exemplary embodiments of the present invention may have the following operations and effects in terms of the user for implementing the hologram video.

First, the hologram device having the pop-up floating structure may be used for showing the company logo, the main videos of the built-in cam, or the like, or for image tuning desired by the customer through the user access awareness when the customer approaches. Second, it is possible to variously transform the video projection method into the projector form, the display form, or the like by the folding function of the pop-up floating structure of the hologram system, controlling the projection video image using the smartphone and the smart watch, and to use the hologram system in connection with the portable hologram generation device of the mobile device or the like using the holder of the tablet PC. Third, the video projection device using the hologram system may be connected to the communication such as a Bluetooth to convert the projection video image, implementing the hologram video according to the customer's preference.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a diagram illustrating an example in which the video projection module according to various exemplary embodiments of the present invention projects a hologram video using a display plate, a projector, a mobile pad, and the like.

Figure 1:
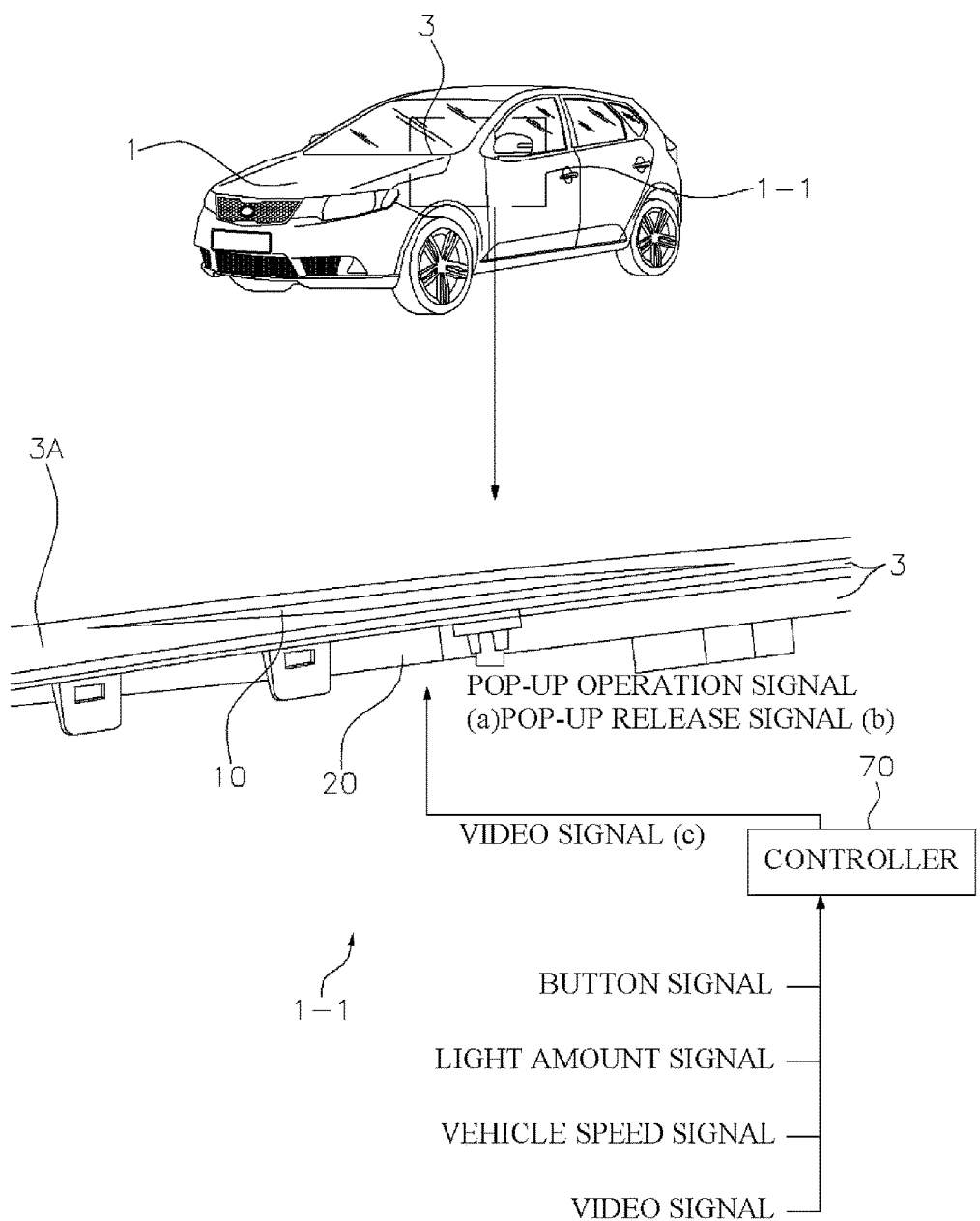
FIG. 1 is a diagram illustrating a configuration of a pop-up floating type hologram system applied to a vehicle according to various exemplary embodiments of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, of the present invention an exemplary embodiment of the present invention will be described in detail with reference to accompanying exemplary drawings, and the exemplary embodiment of the present invention is illustrative and may be implemented by those skilled in the art to which various exemplary embodiments of the present invention pertains in various different forms, and thus is not limited to the exemplary embodiment described herein.

Figure 2:
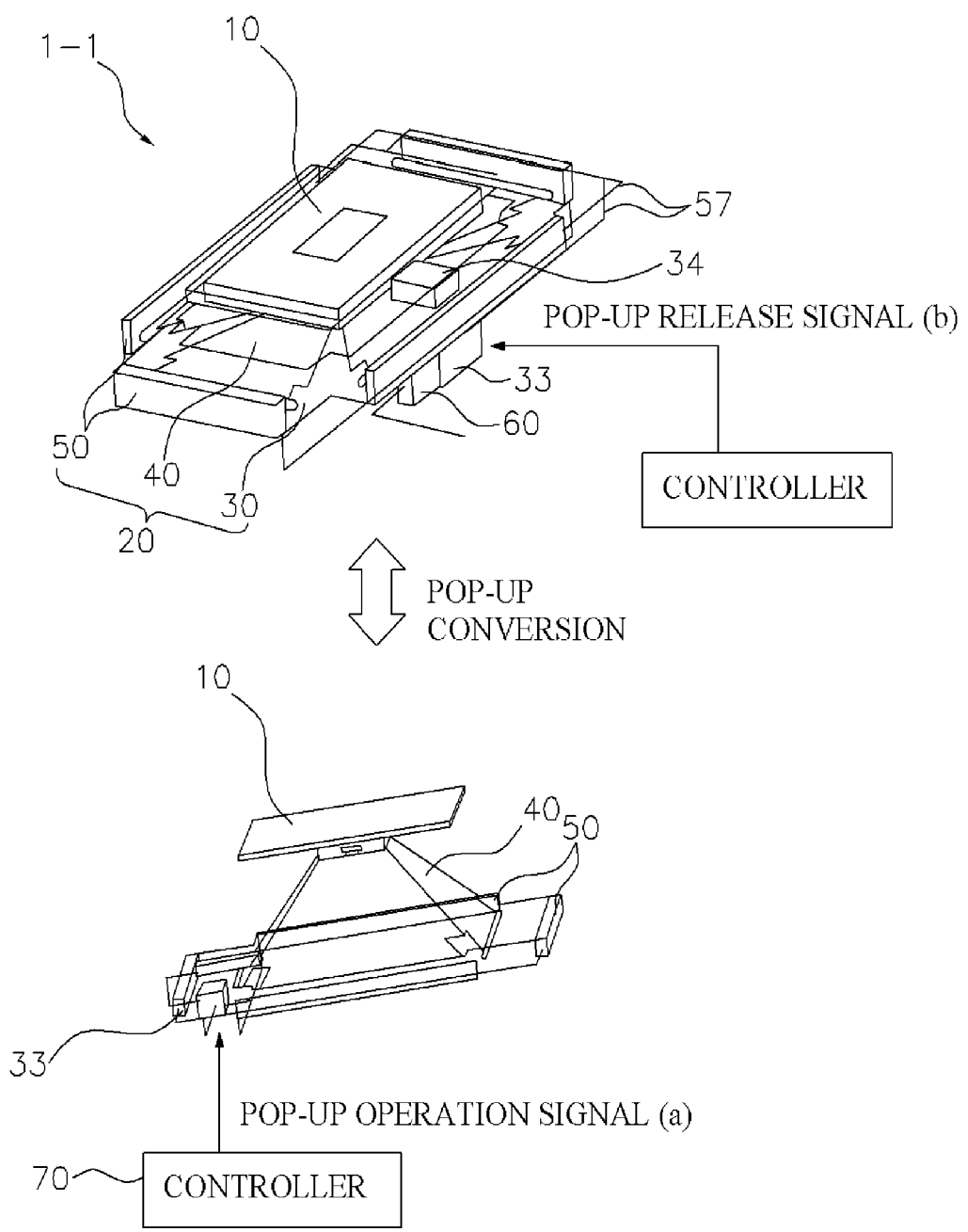
FIG. 2 is a diagram illustrating a state where a pop-up floating module forming the pop-up floating type hologram system according to various exemplary embodiments of the present invention is deformed from a folded state into a pop-up state to move a video projection module upwards.

FIG. 1 and FIG. 2 illustrate a hologram system 1-1.

FIG. 1 illustrates the hologram system 1-1 applied to a vehicle 1. As illustrated, the hologram system 1-1 implements a hologram in a state where a pop-up floating module 20 moves upward and a display module 10 moves upwards.

Figure 11:
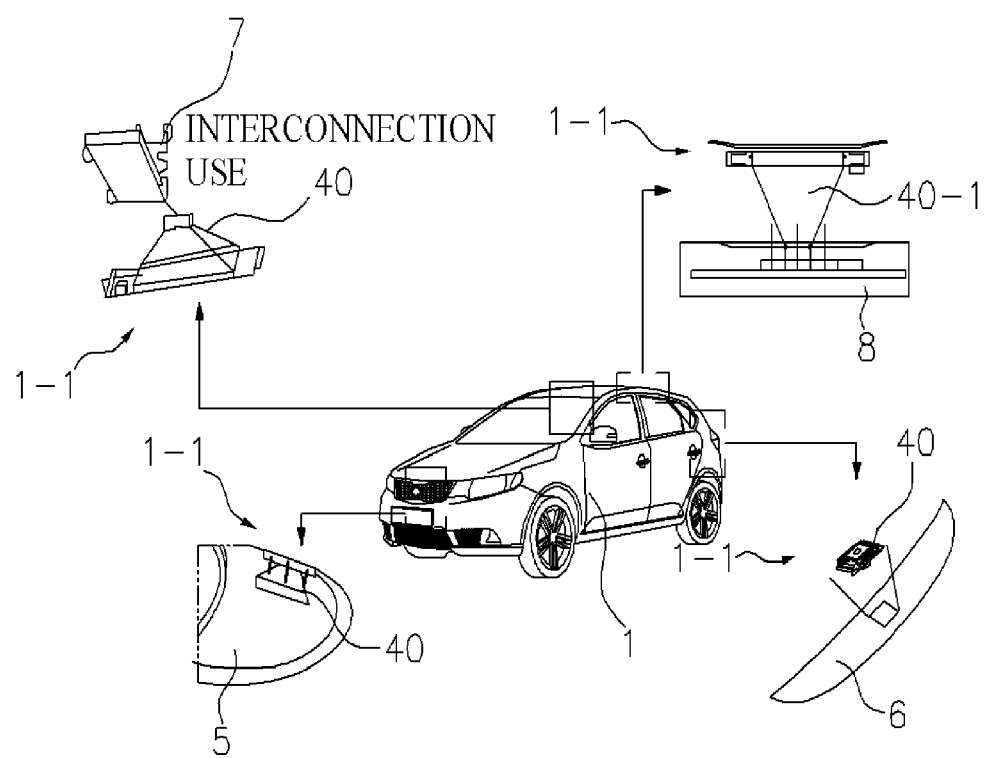
FIG. 11 is a diagram illustrating an example in which the pop-up floating type hologram system according to various exemplary embodiments of the present invention is mounted on an emblem (or logo) of the vehicle, an air spoiler, or a mobile holder in the pyramid pop-up state or mounted on the roof of the vehicle in the reverse pyramid pop-up state.

The hologram system 1-1 uses a pad skin 3A of a crush pad 3 as a vehicle external skin, and is integrally formed with the pad skin 3A to be hidden in an internal space of the crush pad 3, and then exposes a transparent plate 45 (see FIG. 2) as a 45° tilted cube to the outside in a specific situation (e.g., linkage signals of a button, a light amount, and a vehicle speed), implementing the hologram without largely invading the internal space of the vehicle. In the instant case, the crush pad 3 is one example for explanation and exemplarily mounted on various portions of the vehicle 1 in reality as illustrated in FIG. 11.

Therefore, the hologram system 1-1 is characterized as the pop-up floating type hologram system.

To the present end, the hologram system 1-1 includes, as main components, the display module 10, the pop-up floating module 20, and a controller 70.

As an example, the display module 10 forms a surface matched with the pad skin 3A of the crush pad 3 when the hologram is not implemented, projecting the hologram video on a transparent plate 45 (see FIG. 2) of the pop-up floating module 20 by a video signal when protruding to the outside without degrading an aesthetic appearance.

As an example, the pop-up floating module 20 is positioned in the crush pad 3 and accommodated in the internal space, matching the pad skin 3A of the crush pad 3 with the display module 10 when the hologram is not implemented. On the other hand, the pop-up floating module 20 is popped-up to form the transparent plate 45 (see FIG. 2) as the 45° tilted pyramid form when the hologram is implemented by a pop-up operation signal (a) of the controller 70 such that the display module 10 protrudes from the pad skin 3A of the crush pad 3 to the outside.

As an example, the controller 70 utilizes a button signal, a light amount signal, and a vehicle speed signal as input data to output the pop-up operation signal (a) and a pop-up release signal (b) to move the pop-up floating module 20 upward/downward, and outputs a video signal (c) in connection with the pop-up operation signal (a) such that the hologram video may be projected on the display module 10.

To the present end, the controller 70 is provided with a memory for confirming and outputting the signal and operates as a central processing unit (i.e., CPU).

FIG. 2 illustrates components of the pop-up floating module 20. The pop-up floating module 20 includes a base frame 30, a pyramid pop-up device 40, an actuator device 50, and a battery 60.

As an example, the base frame 30 provides an assembly place in which the pyramid pop-up device 40 and the actuator device 50 are mounted, and is provided with a display charger 34 for charging an embedded battery of the display module 10 together with a communication block 33 electrically connected to the controller 70.

As an example, the pyramid pop-up device 40 is coupled to the display module 10 in a state of being assembled in the base frame 30 to move the display module 10 upward/downward, and the actuator device 50 is connected to an electromagnet power source line 57 to generate an electromagnetic force by an electromagnet 51 (see FIG. 6) to which a power source is supplied by a control of the controller 70, moving the pyramid pop-up device 40 upward/downward.

As an example, the battery 60 supplies the power source to the actuator device 50 and is connected to an external power source to be charged.

Figure 3:
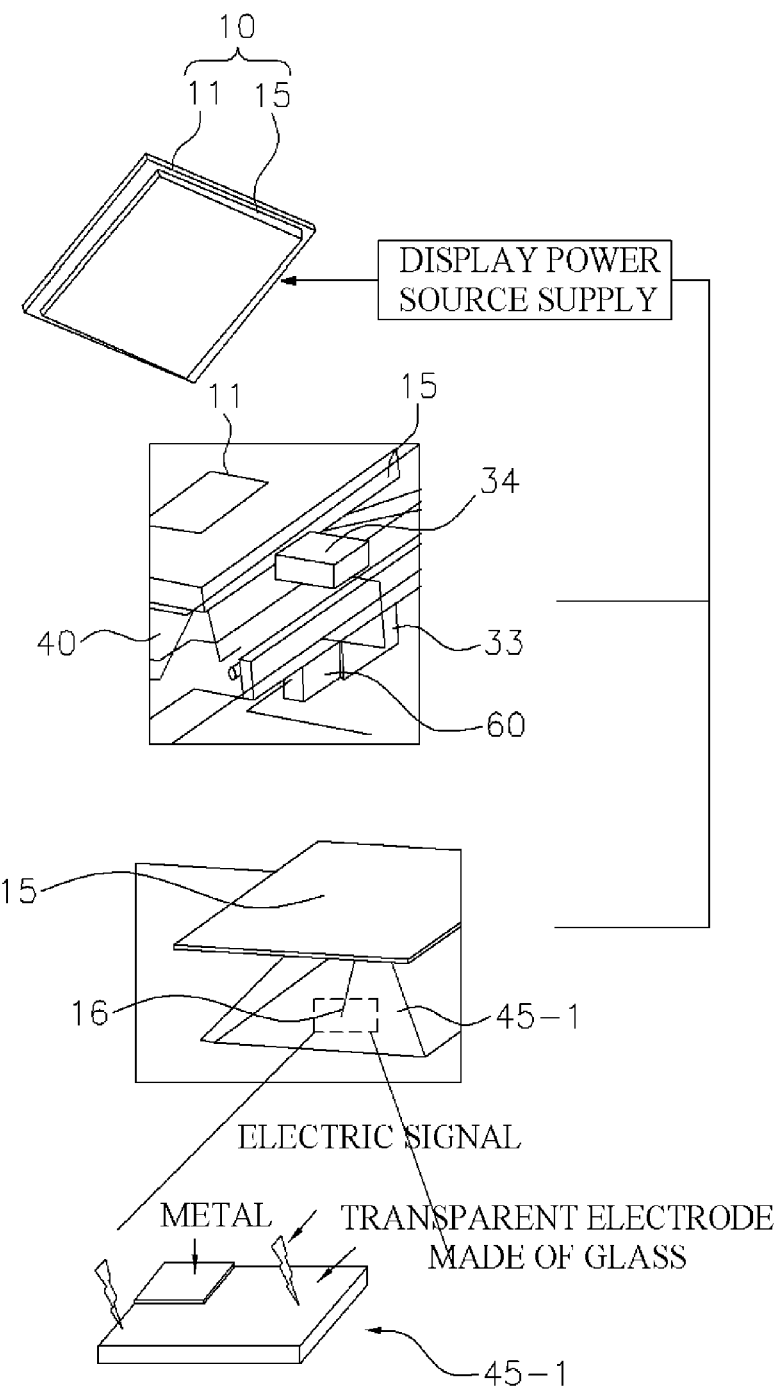
FIG. 3 is a diagram illustrating a configuration in which the video projection module according to various exemplary embodiments of the present invention receives a power source from a battery or a conductive transparent plate.
Figure 4:
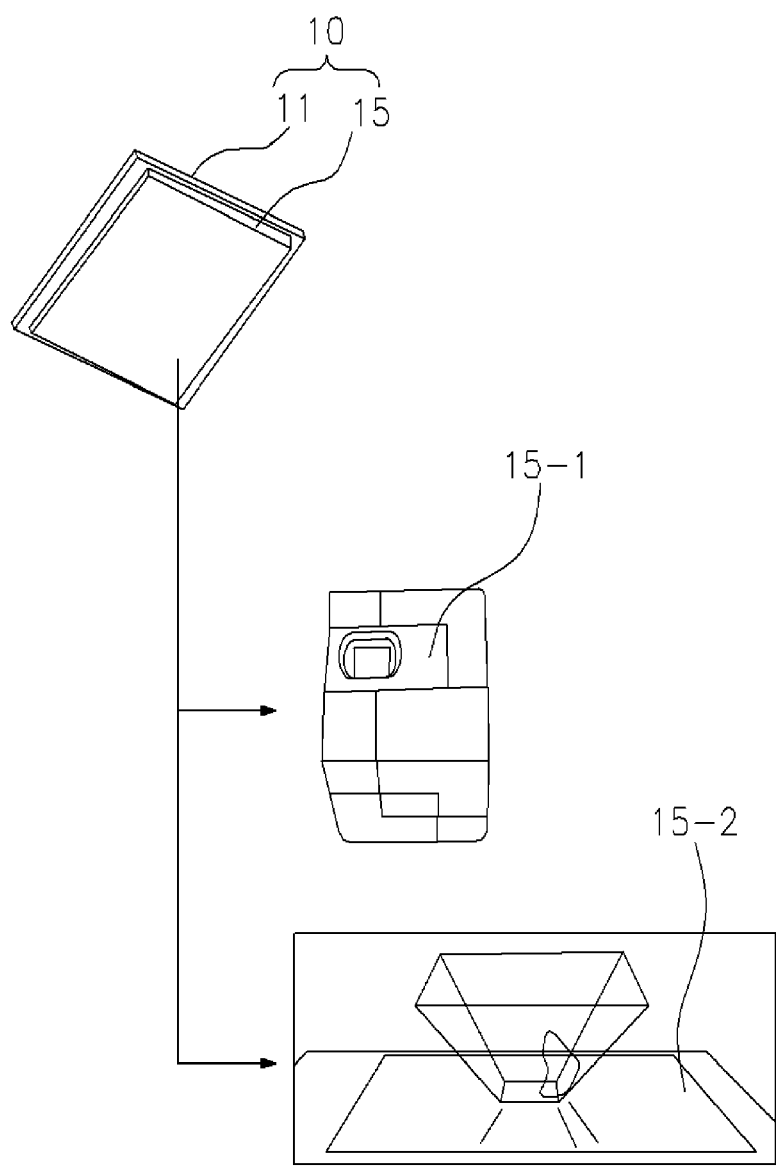

Meanwhile, FIG. 3 and FIG. 4 illustrate a specific configuration of the display module 10.

Referring to FIG. 3, the display module 10 includes a skin plate 11 and a video player 15. In the instant case, the video player 15 may also be connected to the communication such as a Bluetooth separately from the controller 70 to convert the projection video image according to the customer's preference.

As an example, the skin plate 11 is a component for forming an external exposure surface of the hologram system 1-1, and is matched with the vehicle external skin for a target component on which the hologram system 1-1 is mounted. In the instant case, the skin plate 11 is made of the same material as that of the pad skin 3A of the crush pad 3 and formed of a plate of the shape matched with the size and curved shape of a hole formed in the pad skin 3A.

As an example, the video player 15 projects the hologram video on the pyramid pop-up device 40 such that the hologram video is implemented on the pyramid form formed by the transparent plate 45 of the pyramid pop-up device 40. To the present end, the video player 15 receives the video signal (c) of the controller 70 through the communication block 33 of the base frame 30 to play the video.

The video player 15 may implement a display power source supply method in the external power source supply method or its own power source supply method.

As an example, the external power source supply method as a method using the battery 60 has a structure of electrically connecting the display charger 34 of the base frame 30 to the battery 60 and connecting the display charger 34 to a power source connector or the embedded battery of the video player 15 such that the power source of the battery 60 is supplied to the video player 15 through the display charger 34.

On the other hand, its own power source supply method as a method like a solar panel has a structure of using, as the transparent plate 45 of the pyramid pop-up device 40, a conductive transparent plate 45-1 generating the same effect as that of the solar panel to connect a display power source line 16 to the power source connector or the embedded battery of the video player 15 such that the power source generated by the conductive transparent plate 45-1 is supplied to the video player 15 through the display power source line 16.

FIG. 4 illustrates that in the display module 10, the video player 15 for generating the hologram video is variously constituted.

As illustrated, the video player 15 may include or be used with a projector 15-1 and a mobile pad 15-2.

As an example, the projector 15-1 utilizes a method for applying a video projection function of a general projector for magnifying the video to illuminate the video on a screen, and the mobile pad 15-2 has a method for applying the video projection function to a touch pad, which is a screen of a smartphone. In the instant case, the function of the smartphone may also be implemented by the smart watch, controlling the projection video image by the smartphone and the smart watch.

As described above, when projecting the hologram video, the video player 15 may use various methods using the projection function of the projector widely distributed and used or the video playback function of the mobile device.

Hereinafter, the 45° tilted cube of the transparent plate 45 will be described in the 45° tilted pyramid form or the 45° tilted reverse pyramid form.

Figure 5:
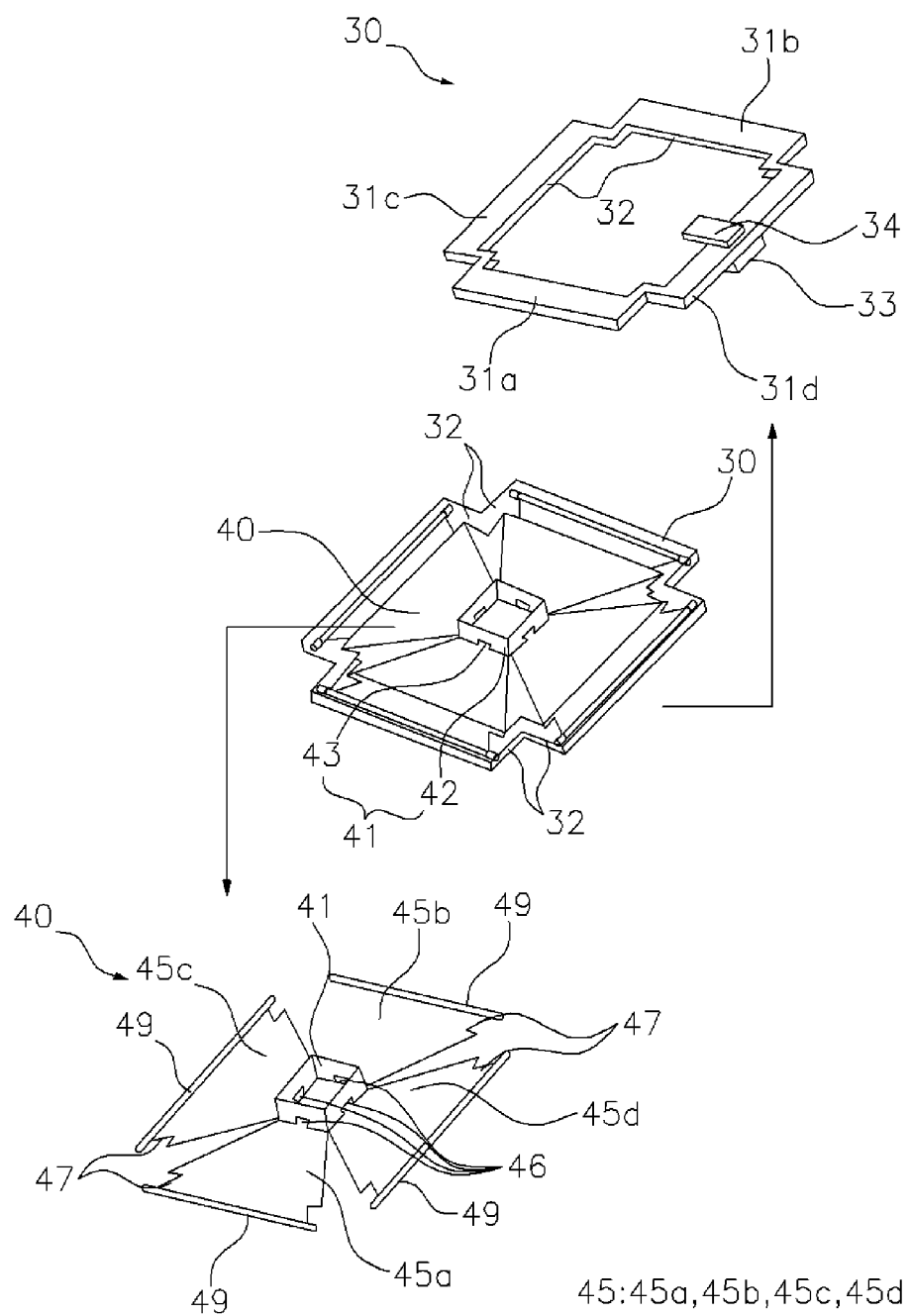
FIG. 5 is a diagram illustrating a configuration of a base frame and a pyramid pop-up device of the pop-up floating module according to various exemplary embodiments of the present invention.
Figure 6:
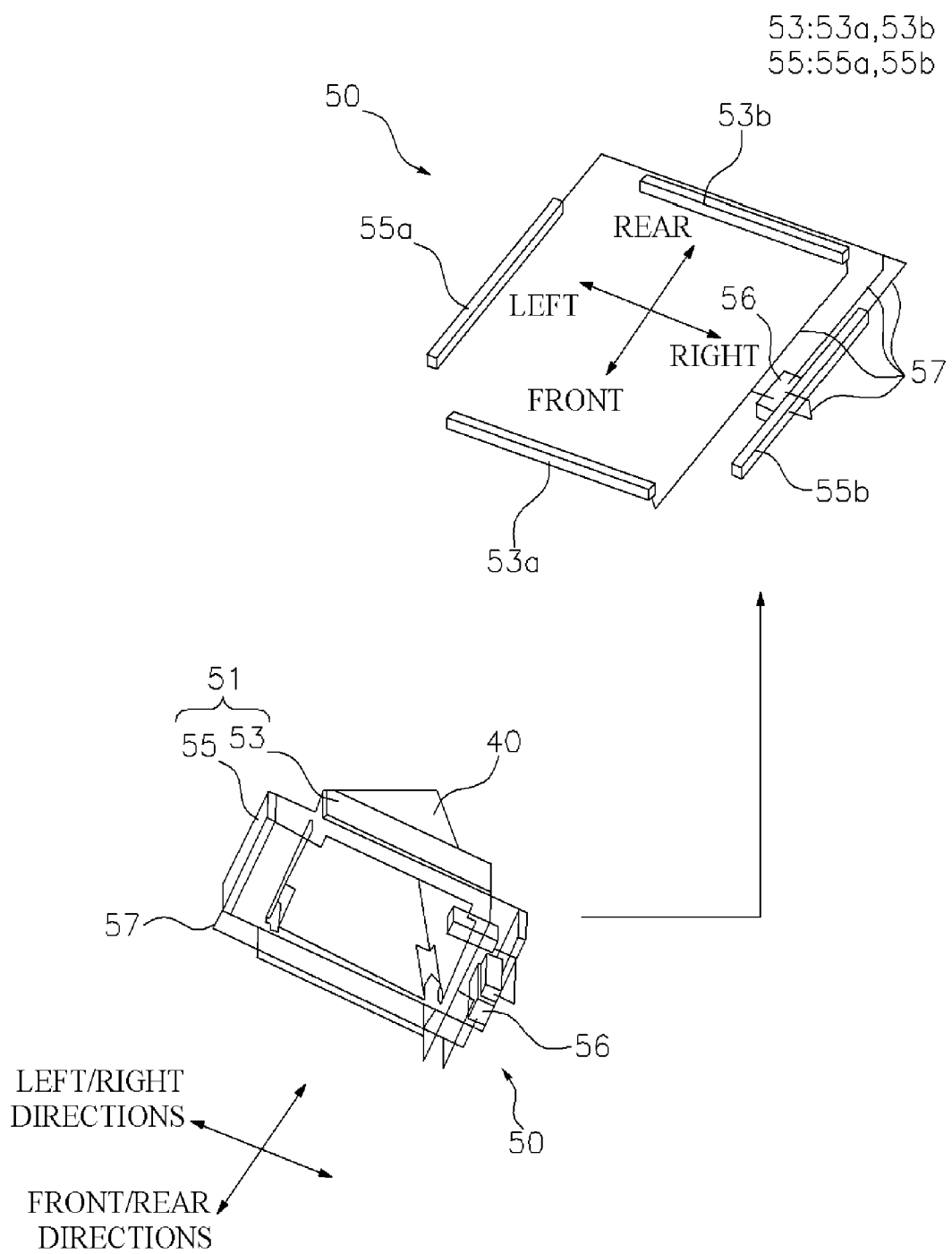
FIG. 6 is a diagram illustrating a configuration of an actuator device of the pop-up floating type hologram system according to various exemplary embodiments of the present invention.
Figure 7:
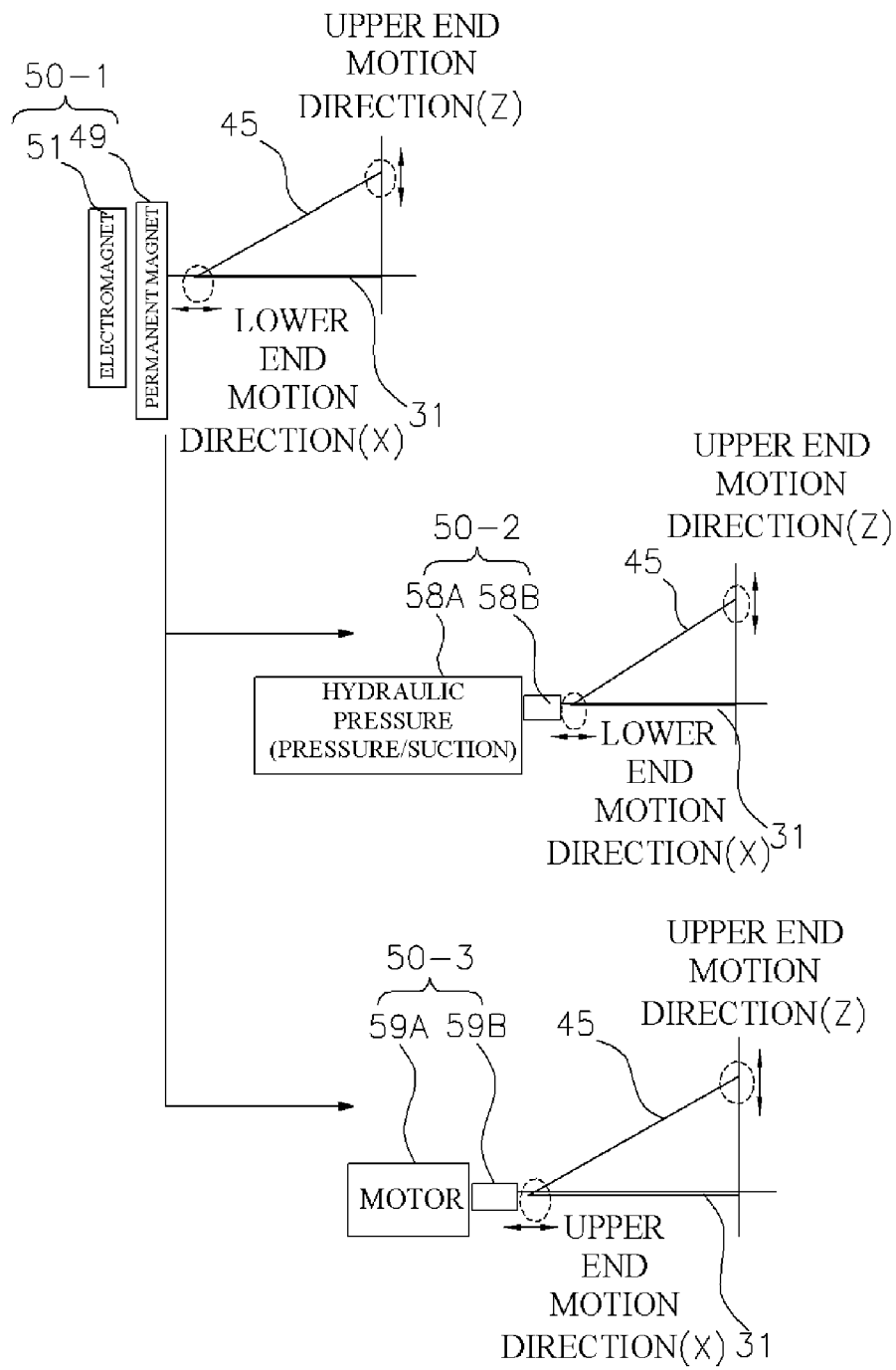
FIG. 7 is a diagram illustrating an example in which the actuator device according to various exemplary embodiments of the present invention utilizes a magnetic force, a hydraulic pressure, and a power of a motor.

Meanwhile, FIG. 5, FIG. 6 and FIG. 7 illustrate specific configurations of the base frame 30, the pyramid pop-up device 40, and the actuator device 50. In the instant case, it is illustrated that the transparent plate 45 forming the pyramid pop-up device 40 includes a pair of four transparent plates, that is, a first transparent plate 45a, a second transparent plate 45b, a third transparent plate 45c, and a fourth transparent plate 45d, but a larger number or a fewer number of transparent plates 45 based on 4 may be constituted to implement the hologram video.

FIG. 5 illustrates specific configurations of the base frame 30 and the pyramid pop-up device 40.

The base frame 30 includes a frame body 31, a rim channel 32, the communication block 33, and the display charger 34.

As an example, the frame body 31 includes four first, second, third, and fourth frames 31a, 31b, 31c, and 31d forming an internal space in which the transparent plate 45 of the pyramid pop-up device 40 displays the hologram video in the 45° tilted pyramid form.

Therefore, the frame body 31 has the first frame 31a, the second frame 31b, the third frame 31c, and the fourth frame 31d formed in a square shape (or rectangular shape) each forming one side surface thereof, and each of the first frame 31a, the second frame 31b, the third frame 31c, and the fourth frame 31d is formed in a "⌐" shape such that each of four edge portions of the square shape (or rectangular shape) is formed in a "∟" shape.

As an example, the rim channel 32 as an empty space of a structure with both edge portions blocked is formed by penetrating each of the first, second, third, and fourth frames 31a, 31b, 31c, and 31d.

Therefore, a permanent magnet 49 provided on each of the four first, second, third, and fourth transparent plates 45a, 45b, 45c, and 45d forming the transparent plate 45 of the pyramid pop-up device 40 is positioned on the rim channel 32, and forms the movement path through which the permanent magnet 49 is pushed by a repulsion force with the electromagnet 51 (see FIG. 6).

As an example, the communication block 33 is connected to the controller 70 to receive the pop-up operation signal (a) and the pop-up release signal (b) to supply the power source to the electromagnet 51 of the actuator device 50 (see FIG. 6) and receives the video signal (c) to operate the video player 15. The display charger 34 is connected to the battery 60 by the power source line and connected to the video player 15 to supply the power source of the battery 60 to the video player 15.

To the present end, it is illustrated that the communication block 33 and the display charger 34 are mounted on the fourth frame 31d but the communication block 33 and the display charger 34 are not limited thereto, and may be mounted on any one of the first, second, third, and fourth frames 31a, 31b, 31c, and 31d.

The communication block 33 may be connected to the communication such as Bluetooth separately from the controller 70 to control the power source supply to and the operation of the video player 15 and the actuator device 50.

The pyramid pop-up device 40 includes a transparent plate holder 41, the transparent plate 45, and the permanent magnet 49.

As an example, the transparent plate holder 41 includes a holder frame 42 formed in a square rim shape, and a protrusion groove 43 which is perforated in each of four surfaces of the holder frame 42. In the instant case, the holder frame 42 holds the transparent plate 45 to move upward together when the transparent plate 45 is popped-up, and the protrusion groove 43 operates around the rotation in which the transparent plate 45 may move upward upon pop-up.

As an example, the transparent plate 45 includes a pair of four transparent plates 45, that is, the first transparent plate 45a, the second transparent plate 45b, the third transparent plate 45c, and the fourth transparent plate 45d formed in a triangular shape and assembled in the transparent plate holder 41, being formed of the 45° tilted cube in the 45° tilted pyramid form, and each of the first transparent plate 45a, the second transparent plate 45b, the third transparent plate 45c, and the fourth transparent plate 45d has an upper protrusion 46 formed on an upper portion thereof. In the instant case, three or five transparent plates 45 may be constituted.

Therefore, the first transparent plate 45a is fitted into the protrusion groove 43 by the upper protrusion 46 to be positioned on a first surface of the holder frame 42, the second transparent plate 45b is fitted into the protrusion groove 43 by the upper protrusion 46 to be positioned on a second surface of the holder frame 42, the third transparent plate 45c is fitted into the protrusion groove 43 by the upper protrusion 46 to be positioned on a third surface of the holder frame 42, and the fourth transparent plate 45d is fitted into the protrusion groove 43 by the upper protrusion 46 to be positioned on a fourth surface of the holder frame 42.

Furthermore, each of the first transparent plate 45a, the second transparent plate 45b, the third transparent plate 45c, and the fourth transparent plate 45d is formed with a lower extension body 47 as a stepped structure using an opposite side of the upper protrusion 46 as a lower portion thereof.

Therefore, each of the first transparent plate 45a, the second transparent plate 45b, the third transparent plate 45c, and the fourth transparent plate 45d has the permanent magnet 49 attached using the lower extension body 47.

As an example, the permanent magnet 49 is provided on each of the first transparent plate 45a, the second transparent plate 45b, the third transparent plate 45c, and the fourth transparent plate 45d. In the instant case, the permanent magnets 49 have the polarities of N poles disposed as the polarities facing the electromagnet 51.

Therefore, with respect to first, second, third, and fourth frames 31a, 31b, 31c, 31d of the frame body 31, the permanent magnet 49 of the first transparent plate 45a is inserted into the rim channel 32 of the first frame 31a, the permanent magnet 49 of the second transparent plate 45b is inserted into the rim channel 32 of the second frame 31b, the permanent magnet 49 of the third transparent plate 45c is inserted into the rim channel 32 of the third frame 31c, and the permanent magnet 49 of the fourth transparent plate 45d is inserted into the rim channel 32 of the fourth frame 31d.

Referring to FIG. 6, the actuator device 50 includes a magnetic force pop-up device 50-1 using the electromagnet 51, an electromagnet connector 56, and the electromagnet power source line 57. Therefore, the magnetic force pop-up device 50-1 utilizes the magnetic forces of the electromagnet 51 and the permanent magnet 49 by the power source supply as power.

The electromagnet 51 includes a first electromagnet 53a, a second electromagnet 53b, a third electromagnet 55a, and a fourth electromagnet 55b, in which the first and second electromagnets 53a, 53b form a pair of front/rear electromagnets 53, and the third and fourth electromagnets 55a, 55b form a pair of left/right electromagnets 55. In the instant case, each of the first, second, third, and fourth electromagnets 53a, 53b, 55a, and 55b generates a repulsive force of N-N with the N pole of the electromagnet 51 forming and facing the N pole by the current flow of the pop-up operation signal (a) by the controller 70, whereas forming an attractive force of the S-N with the N pole of the electromagnet 51 forming and facing the S pole by the current reverse flow of the pop-up release signal (b) by the controller 70.

As an example, the pair of front/rear electromagnets 53 are arranged in front/rear directions of the base frame 30, in which the first electromagnet 53a is positioned outside of the first frame 31a of the frame body 31 to face the permanent magnet 49 inserted into the rim channel 32 of the first frame 31a, and the second electromagnet 53b is positioned outside of the second frame 31b of the frame body 31 to face the permanent magnet 49 inserted into the rim channel 32 of the second frame 31b.

As an example, the pair of left/right electromagnets 55 are disposed in left/right directions of the base frame 30, in which the third electromagnet 55a is positioned outside of the third frame 31c of the frame body 31 to face the permanent magnet 49 inserted into the rim channel 32 of the third frame 31c, and the fourth electromagnet 55b is positioned outside of the fourth frame 31d of the frame body 31 to face the permanent magnet 49 inserted into the rim channel 32 of the fourth frame 31d.

Therefore, the pair of front/rear electromagnets 53 move the first and second transparent plates 45a, 45b upward by the repulsive forces between the first and second electromagnets 53a, 53b and the permanent magnet 49, or move them down by the attractive forces therebetween, and the pair of left/right electromagnets 55 move the third and fourth transparent plates 45c, 45d upward by the repulsive forces between the third and fourth electromagnets 55a, 55b and the permanent magnet 49, or move them down by the attractive forces therebetween.

As an example, the electromagnet connector 56 supplies the power source of the battery 60 through the electromagnet power source line 57 connected to the first electromagnet 53a, the second electromagnet 53b, the third electromagnet 55a, and the fourth electromagnet 55b. In the instant case, the electromagnet connector 56 is provided on the frame body 31 of the base frame 30, and mounted on the fourth frame 31d of the frame body 31 to be close to the fourth electromagnet 55b.

As an example, the electromagnet power source line 57 comes from the electromagnet connector 56 to connect the pair of left/right electromagnets 55 and the pair of front/rear electromagnets 53. Therefore, the electromagnet power source line 57 supplies the power source to the first and second electromagnets 53a, 53b of the pair of left/right electromagnets 55 and the third and fourth electromagnets 55a, 55b of the pair of front/rear electromagnets 53, respectively.

FIG. 7 illustrates an operation of the magnetic force pop-up device 50-1 popping-up the transparent plate 45 in the 45° tilted pyramid form by the magnetic forces of the electromagnet 51 and the permanent magnet 49.

As illustrated, in the magnetic force pop-up device 50-1, a lower end motion direction (X) through the repulsive force by the power source supply using the magnetic forces of the electromagnet 51 and the permanent magnet 49 as power pushes the permanent magnet 49 from the rim channel 32 formed on the frame body 31 of the base frame 30 by the sliding movement, and an upper end motion direction (Z) through the sliding movement moves the transparent plate 45 upward such that the first, second, third, and fourth transparent plates 45a, 45b, 45c, and 45d of the transparent plate 45 are raised and popped-up in the 45° tilted pyramid form.

The actuator device 50 may be constituted such that a hydraulic pop-up device 50-2 or a motor pop-up device 50-3 instead of the magnetic force pop-up device 50-1 is used for the power popping-up the transparent plate 45 in the 45° tilted pyramid form.

As an example, the hydraulic pop-up device 50-2 includes a hydraulic motor 58A and a hydraulic hose 58B, in which the hydraulic motor 58A delivers a hydraulic pressure or a suction force to the hydraulic hose 58B to form the lower end motion direction (X) and upper end motion direction (Z) for the first, second, third, and fourth transparent plates 45a, 45b, 45c, and 45d of the transparent plate 45.

To the present end, each of the first, second, third, and fourth transparent plates 45a, 45b, 45c, and 45d may substitute the permanent magnet 49 with a bar shape in the hydraulic pop-up device 50-2 to receive fluid contact and suction forces to be pushed and pulled.

As an example, the motor pop-up device 50-3 includes an electric motor 59A and a gear 59B, in which the electric motor 59A forms the lower end portion motion direction (X) and the upper end motion direction (Z) for the first, second, third, and fourth transparent plates 45*a*, 45*b*, 45*c*, and 45*d* of the transparent plate 45 by a linear movement force of the gear 59B obtained by converting the motor rotation into the linear movement.

To the present end, each of the first, second, third, and fourth transparent plates 45*a*, 45*b*, 45*c*, and 45*d* may substitute the permanent magnet 49 with a rack bar in the motor pop-up device 50-3 to convert the pinion rotation of the motor 59A into the linear movement to be pushed or pulled or substitute the permanent magnet 49 with the bar shape to receive the linear movement of the gear 59B to be pushed or pulled.

Figure 8:
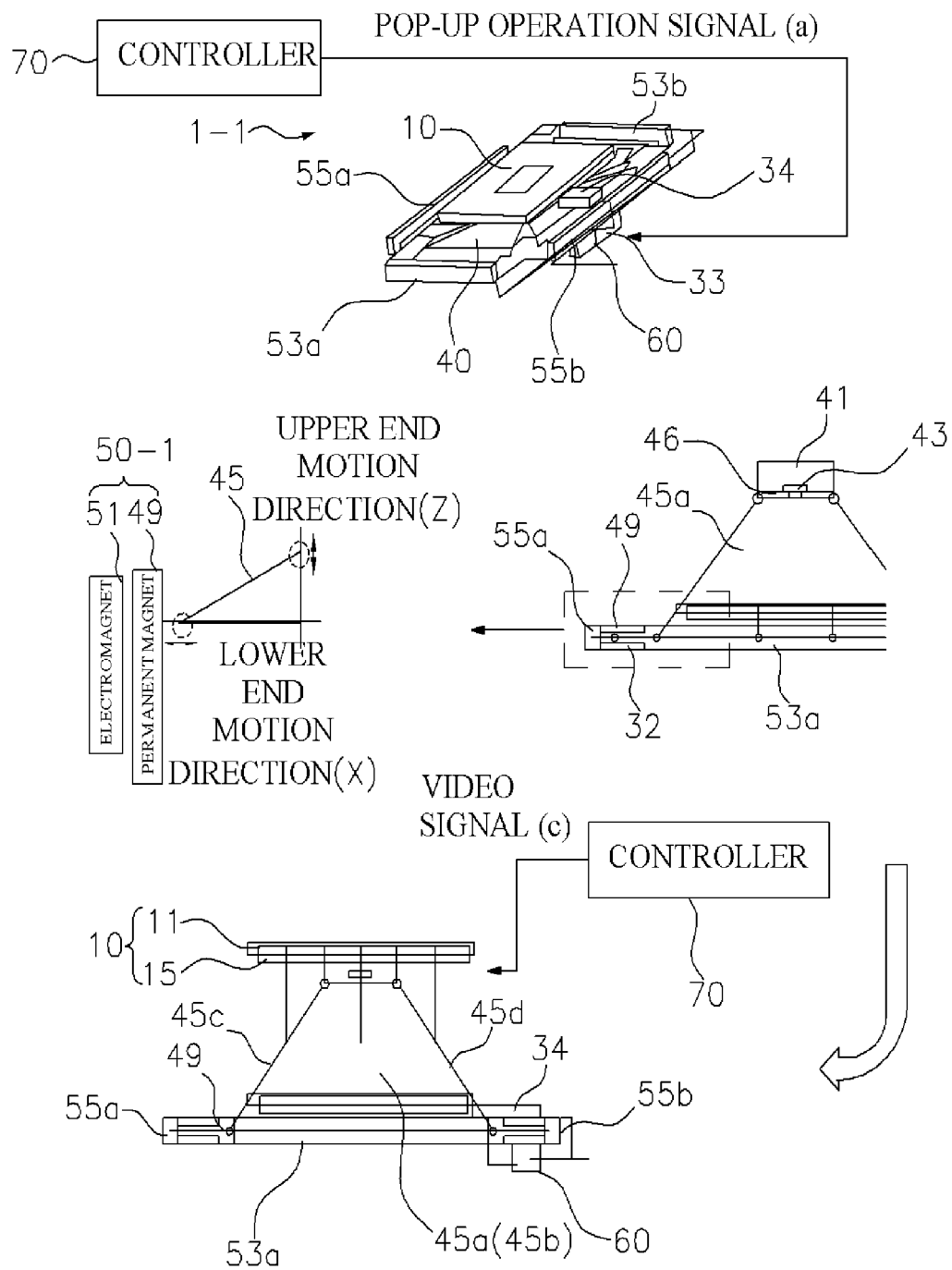
FIG. 8 is a diagram illustrating an example in which the pop-up floating type hologram system according to various exemplary embodiments of the present invention operates in the pyramid pop-up state.

Meanwhile, FIG. 8 illustrates an operation of the actuator device 50 moving the transparent plate 45 upward such that the hologram system 1-1 forms the pyramid pop-up shape.

As illustrated, in the communication block 33 of the base frame 30, the controller 70 receives the pop-up operation signal (a) to supply the power source of the battery 60 to the pair of front/rear electromagnets 53 and the pair of left/right electromagnets 55 forming the electromagnet 51 of the magnetic force pop-up device 50-1 forming the actuator device 50, and the current flow direction of the power source supply forms each of the first electromagnet 53*a*, the second electromagnet 53*b*, the third electromagnet 55*a*, and the fourth electromagnet 55*ba* as the N pole.

Accordingly, the permanent magnet 49 of the first transparent plate 45*a* facing the first electromagnet 53*a*, the permanent magnet 49 of the third transparent plate 45*c* facing the second electromagnet 53*b*, the permanent magnet 49 of the fourth transparent plate 45*d* facing the third electromagnet 55*a*, and the permanent magnet 49 of the second transparent plate 45*b* facing the fourth electromagnet 55*b* form the repulsive forces with the same N poles, and the repulsive force of the N-N pole generates the magnetic repulsive force.

Subsequently, the magnetic repulsive force operates as a force pushing the permanent magnet 49 to form the lower end motion direction (X) in which the permanent magnet 49 is pushed from the rim channel 32 formed on the frame body 31 of the base frame 30 by the sliding movement, and the lower end movement direction (X) is evenly generated on the first, second, third, and fourth transparent plates 45*a*, 45*b*, 45*c*, and 45*d* each facing the first, second, third, and fourth electromagnets 53*a*, 53*b*, 55*a*, and 55*b* via the permanent magnet 49 to form the upper end motion direction (Z) by the movement in which the first and third transparent plates 45*a*, 45*c* and the second and fourth transparent plates 45*b*, 45*d* approach each other.

Accordingly, the upper end motion direction (Z) operates as a force moving the first, second, third, and fourth transparent plates 45*a*, 45*b*, 45*c*, and 45*d* upward such that the transparent holder 41 coupled to the upper protrusion 46 by the protrusion groove 43 moves upward together with the first, second, third, and fourth transparent plates 45*a*, 45*b*, 45*c*, and 45*d*, and the display module 10 moves upward together with the transparent plate holder 41 to protrude from the pad skin 3A of the crush pad 3 (see FIG. 1) to the outside.

As a result, the transparent plate 45 having the first, second, third, and fourth transparent plates 45*a*, 45*b*, 45*c*, and 45*d* formed in the 45° tilted pyramid form is exposed from the crush pad 3 to the outside, and in such a state, the video player 15 outputs the hologram video by the video signal (c) of the controller 70, and the transparent plate 45 implements the hologram video through the pyramid form of the first, second, third, and fourth transparent plates 45*a*, 45*b*, 45*c*, and 45*d*.

On the other hand, the pop-up release signal (b) of the controller 70 reverses the current flow of the battery 60 to convert the polarities of the first, second, third, and fourth electromagnets 53*a*, 53*b*, 55*a*, and 55*b* into S poles to form the attractive force of the S-N with the permanent magnet 49 of the N pole, the attractive force pulls the permanent magnet 49 to return the first, second, third, and fourth transparent plates 45*a*, 45*b*, 45*c*, and 45*d* to the flat initial state (i.e., horizontal state of 0°), and the display module 10 moves downward together with the transparent plate holder 41 to closely contact with the pad skin 3A of the crush pad 3 (see FIG. 1) not to be exposed and to be accommodated in the internal space of the crush pad 3.

When the power source supply of the battery 60 is cut off, the return of the first, second, third, and fourth transparent plates 45*a*, 45*b*, 45*c*, and 45*d* to the flat initial state may be performed by a force pressing the transparent plate holder 41 by its own weight of the display module 10 without switching the polarities of the first, second, third, and fourth electromagnets 53*a*, 53*b*, 55*a*, and 55*b*.

Subsequently, when the display module 10 becomes a state of not being exposed to the outside, the power source of the battery 60 is charged in the embedded battery of the video player 15 through the display charger 34 such that the power source is stably supplied to the video player 15 after the pop-up operation.

Figure 9:
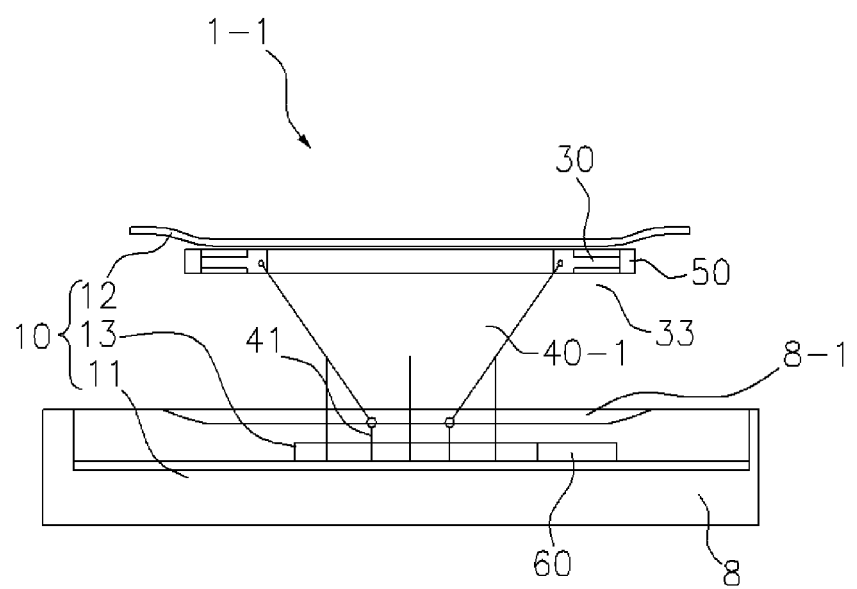
FIG. 9 is a diagram illustrating an example in which the pop-up floating type hologram system according to various exemplary embodiments of the present invention operates in a reverse pyramid pop-up state.
Figure 10:
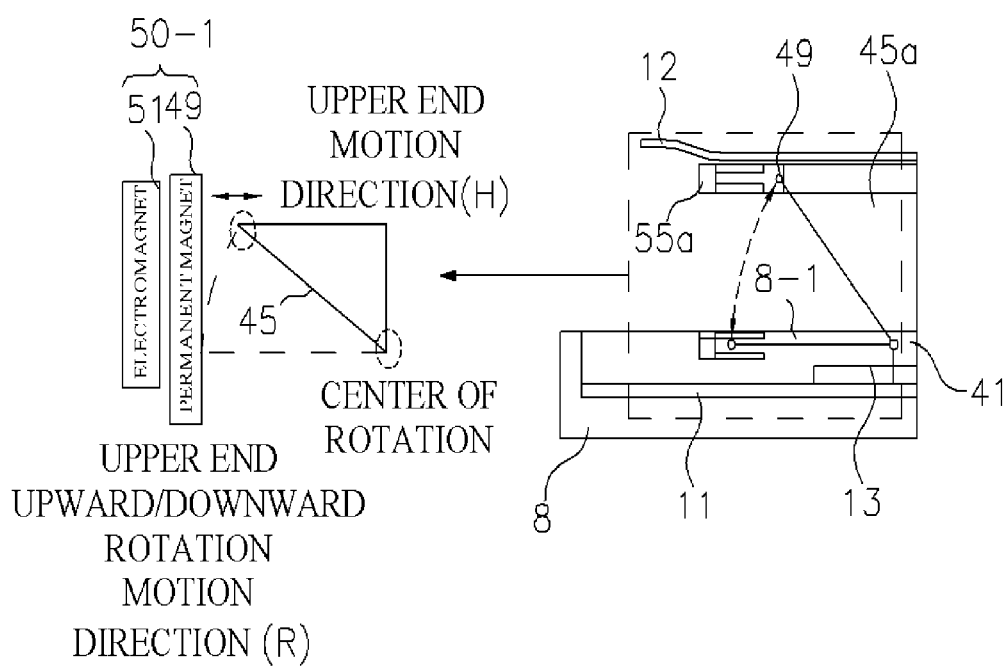
FIG. 10 is a diagram illustrating a principle of a reverse pyramid pop-up operation of the pop-up floating type hologram system according to various exemplary embodiments of the present invention.

Meanwhile, FIG. 9 and FIG. 10 illustrate examples in which the hologram system 1-1 includes a reverse pyramid pop-up device 40-1 instead of the pyramid pop-up device 40.

Referring to FIG. 9, the reverse pyramid pop-up device 40-1 includes, as components, the display module 10, the base frame 30, the pyramid pop-up device 40, and the actuator device 50, being composed of the same components as those of the pyramid pop-up device 40.

However, in the reverse pyramid pop-up device 40-1, the transparent plate 45 of the pyramid pop-up device 40 has the first, second, third, and fourth transparent plates 45*a*, 45*b*, 45*c*, and 45*d* formed in the 45° tilted reverse pyramid form such that there is a difference in a method in which the video player 15 of the display module 10 projects the hologram video from a bottom to a top.

Therefore, there is a difference in that the display module 10 is provided with a roof skin plate 12 in addition to the skin plate 11 and the video player 15, the skin plate 11 and the video player 15 are embedded in a roof 8 of the vehicle, and the roof skin plate 12 closely contacts with a roof seating surface 8-1 of the roof 8 to be integrated with the roof skin upon non-operation of the reverse pyramid pop-up device 40-1.

FIG. 10 illustrates an operation of the reverse pyramid pop-up device 40-1 popping-up the transparent plate 45 in the 45° tilted reverse pyramid form by the magnetic forces of the electromagnet 51 and the permanent magnet 49.

As illustrated, the reverse pyramid pop-up device 40-1 utilizes the magnetic force pop-up device 50-1 (see FIG. 7) such that an upper end motion direction (H) through the repulsive force by the power source supply using the magnetic forces of the electromagnet 51 and the permanent magnet 49 as power pushes the permanent magnet 49 from the rim channel 32 formed on the frame body 31 of the base frame 30 by the sliding movement, and the upper end motion direction (H) through the sliding movement forms an upper end upward/downward rotation motion direction (R) by the movement in which the first, second, third, and fourth transparent plates 45a, 45b, 45c, and 45d approach each other.

Accordingly, the upper end upward/downward rotation motion direction (R) operates as a force moving the first, second, third, and fourth transparent plates 45a, 45b, 45c, and 45d upward in an upper end upward rotation motion direction in a state where the transparent plate holder 41 coupled to the upper protrusion 46 by the protrusion groove 43 is constraint to the roof 8, and the roof skin plate 12, the base frame 30, and the actuator device 50 move upward together with the first, second, third, and fourth transparent plates 45a, 45b, 45c, and 45d to protrude from the roof 8 to the outside in the state where the display module 10 is constraint to the roof 8.

As a result, the transparent plate 45 is exposed from the roof 8 to the outside in the 45° tilted reverse pyramid form of the first, second, third, and fourth transparent plates 45a, 45b, 45c, and 45d, and in such a state, the video player 15 outputs the hologram video by the video signal (c) of the controller 70, and the transparent plate 45 implements the hologram video through the reverse pyramid form of the first, second, third, and fourth transparent plates 45a, 45b, 45c, and 45d.

On the other hand, the upper end downward rotation motion direction of the upper end upward/downward rotation motion direction (R) pulls the transparent plate 45 in the reverse process of the upper end upward rotation motion direction to return the first, second, third, and fourth transparent plates 45a, 45b, 45c, and 45d to the flat initial state (i.e., horizontal state of 0°), and the roof skin plate 12, the base frame 30, and the actuator device 50 move downward such that the roof skin plate 12 covers the roof seating surface 8-1 of the roof 8 to be integrated as the skin.

Meanwhile, FIG. 11 illustrates an example in which the pop-up floating type hologram system 1-1 is mounted on the vehicle 1.

As illustrated, the vehicle 1 may be mounted with the pop-up floating type hologram system 1-1 using the emblem 5 representing the logo of the vehicle manufacturer, the air spoiler 6 for improving air resistance performance during traveling, the mobile holder 7 for attaching the mobile device, such as a smartphone or a note pad including a navigation, and the roof 8. In the instant case, a smart watch may directly control the projection video image in a state of being worn by a driver or a passenger without applying the mobile holder 7.

As an example, the emblem 5, the air spoiler 6, and the hologram system 1-1 using the pyramid pop-up device 40 illustrated in FIG. 1, FIG. 2, FIG. 3, FIG. 4, FIG. 5, FIG. 6, FIG. 7, FIG. 8 and FIG. 9 is applied to the mobile holder 7, whereas the roof 8 forms the roof seating surface 8-1 such that the hologram system 1-1 applying the reverse pyramid pop-up device 40-1 illustrated in FIG. 9 and FIG. 10 may be applied.

As described above, the pop-up floating type hologram system 1-1 mounted on the vehicle 1 according to the exemplary embodiment of the present invention includes the pop-up floating module 20 in which the hologram video projected by the video player 15 provided with the skin plate 11 as the vehicle external skin is implemented by the 45° tilted cube of the transparent plate 45 externally exposed through any one of the crush pad 3, the emblem 5, the air spoiler 6, and the mobile holder 7 in the pyramid form or externally exposed through the roof 8 in the reverse pyramid form by the movement by the repulsive force between the electromagnet 51 forming the N pole and the permanent magnet 29 facing the electromagnet 51 as the N pole by the power source supply, hiding the pop-up floating type hologram system 1-1 using the external skin upon non-operation, and utilizes the sliding structure for the pop-up floating structure for changing the shape of the 45° tilted transparent plate, eliminating the package space constraint for the vehicle external skin by saving the package space.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A hologram system comprising:
a display module configured for projecting a hologram video; and
a pop-up floating module configured for pushing an N pole of a permanent magnet facing an N pole of an electromagnet by a repulsive force with the electromagnet to raise a transparent plate to a tilted cube, and for recognizing the hologram video appearing inside the tilted cube in a state where the tilted cube protrudes outside through the transparent plate.

2. The hologram system of claim 1,
wherein the electromagnet forms an S pole by changing a flow direction of a current applied thereto to convert the repulsive force into an attractive force.

3. The hologram system of claim 1,
wherein the transparent plate includes a pair of a first transparent plate, a second transparent plate, a third transparent plate, and a fourth transparent plate formed in a triangular shape and formed as the tilted cube.

4. The hologram system of claim 3,
wherein the tilted cube is formed in a pyramid form so that the display module projects the hologram video from a top to a bottom of the tilted cube.

5. The hologram system of claim 3,
wherein the tilted cube is formed in a reverse pyramid form so that the display module projects the hologram video from a bottom to a top of the tilted cube.

6. The hologram system of claim 1,
wherein the display module is operated by receiving a power source of a battery from the outside thereof.

7. The hologram system of claim 1,
wherein the display module is operated by receiving a power source generated by an effect of a solar panel of the transparent plate.

8. The hologram system of claim 1,
wherein the display module projects the hologram video by a video player.

9. The hologram system of claim 8,
wherein the video player is provided with a skin plate matched with a vehicle external skin or a roof skin plate matched with a vehicle roof skin.

10. The hologram system of claim 8,
wherein the video player is a projector or a mobile pad.

11. The hologram system of claim 1, wherein the pop-up floating module includes:
a base frame including a frame body forming a bottom surface of the tilted cube, and forming a rim channel forming a sliding movement path of the permanent magnet inside the frame body;
a pyramid pop-up device provided with a transparent plate holder on an upper portion of the transparent plate, in which the permanent magnet slidably moved is coupled to a lower portion thereof, and forming an apical portion of the tilted cube by constraining the upper portion of the transparent plate by the transparent plate holder; and
an actuator device having the electromagnet facing the permanent magnet provided outside a rim portion of the base frame.

12. The hologram system of claim 11,
wherein the rim channel is formed in an open structure so that the repulsive force operates in the state where the permanent magnet and the electromagnet face.

13. The hologram system of claim 11,
wherein the frame body is provided with a communication block and a display charger,
wherein the communication block operates the electromagnet by a pop-up operation signal and a pop-up release signal for a current flow direction thereof, and operates the display module by a video signal for projecting the hologram video, and
wherein the display charger supplies a power source of a battery to the electromagnet and the display module.

14. The hologram system of claim 11,
wherein a constraint structure of the transparent plate holder and the upper portion of the transparent plate is formed in an upper protrusion of the transparent plate fitted into a protrusion groove of the transparent plate holder, and
wherein the upper protrusion operates around rotation of raising the transparent plate by sliding movement through the protrusion groove.

15. The hologram system of claim 11,
wherein the electromagnet receives a power source of a battery through an electromagnet power source line, and
wherein the electromagnet power source line is provided on the frame body of the base frame and connected to an electromagnet connector connected to the battery.

16. The hologram system of claim 11,
wherein the actuator device forms the tilted cube by a hydraulic motor for delivering a hydraulic pressure or a suction force to the transparent plate by a hydraulic hose or by an electric motor for delivering a linear movement force to the transparent plate by a gear.

17. The hologram system of claim 11,
wherein the display module and the pop-up floating module are connected to a controller for outputting a pop-up operation signal, a pop-up release signal, and a video signal,
wherein the pop-up operation signal and the pop-up release signal are outputted to the pop-up floating module to change a current flow direction so that an N pole and an S pole are formed in the electromagnet, and
wherein the video signal is outputted to the display module to project the hologram video.

18. The hologram system of claim 1,
wherein the pop-up floating module is provided with a battery, and
wherein the battery supplies a power source to the display module and the electromagnet.

19. A vehicle,
wherein a pop-up floating type hologram system is mounted on one of a crush pad forming a vehicle driver seat, an emblem representing a logo of a vehicle manufacturer, an air spoiler for improving air resistance performance during traveling, and a mobile holder for attaching a mobile device, and wherein in the hologram system, a 0° transparent plate is formed as a 45° tilted cube by movement by a repulsive force between an electromagnet forming an N pole and a facing N pole of a permanent magnet to protrude in a pyramid form, and a hologram video projected by a video player provided with a skin plate as a vehicle external skin is formed inside the tilted cube to be recognized from the outside thereof through the transparent plate.

20. A vehicle, wherein a pop-up floating type hologram system is mounted on a roof seating surface of a roof, and wherein in the hologram system, a 0° transparent plate is formed as a 45° tilted cube by movement by a repulsive force between an electromagnet forming an N pole and a facing N pole of a permanent magnet to protrude in a reverse pyramid form, and a hologram video projected by a video player provided with a roof skin plate as a roof external skin is formed inside the tilted cube to be recognized from the outside thereof through the transparent plate.

* * * * *